United States Patent [19]

Hansen et al.

[11] 4,073,464
[45] Feb. 14, 1978

[54] CYLINDER VALVE FOR GAS FIRE EXTINGUISHING SYSTEM

[75] Inventors: Arne Hansen, New City, N.Y.; George Troup, Hatboro, Pa.

[73] Assignee: Chemetron Corporation, Chicago, Ill.

[21] Appl. No.: 717,279

[22] Filed: Aug. 24, 1976

[51] Int. Cl.² ............... F16K 31/383; F16K 31/40
[52] U.S. Cl. ............................... 251/26; 251/30; 169/9; 169/22
[58] Field of Search ............ 251/26, 43, 44, 35, 251/30; 169/20, 22, 9

[56] References Cited

U.S. PATENT DOCUMENTS

| 387,179 | 7/1888 | Nagle | 251/28 X |
| 3,180,355 | 4/1965 | Long | 251/26 X |
| 3,254,870 | 6/1966 | Haessler et al. | 251/43 |
| 3,860,073 | 1/1975 | Willms | 251/43 X |

Primary Examiner—Arnold Rosenthal
Attorney, Agent, or Firm—Paul & Paul

[57] ABSTRACT

A fire extinguishing system that is of the gas dispersion type is provided, whereby a given supply cylinder, controlled by a cylinder valve, is piped to a plurality of directional or line valves for delivery to various locations. Sensing devices are also provided for controlling the line valves and cylinder valves as are manual valve operators. A particularly novel cylinder valve is provided, whereby once the valve is opened, venting of one side of the piston prevents closing prior to discharge of fluid from the cylinder.

6 Claims, 6 Drawing Figures

CYLINDER VALVE FOR GAS FIRE EXTINGUISHING SYSTEM

BACKGROUND OF THE INVENTION

While fire extinguishing systems of the type employing gas cylinders for distribution through valving arrangements to gas dissemination points have been utilized in the past, and in many instances automatic sensing systems have been utilized to open the cylinder valve or other container valve for supply of fluid to gas dissemination points, in devices of prior art types, the cylinder valves can shut down in the event that fire reaches the sensing devices, or for some other reason the sensing devices fail to operate once they have initially opened the valve.

SUMMARY OF THE INVENTION

The present invention is directed toward providing an improvement in cylinder valves of the fluid operative, preferably gas disseminating type, for use in fire extinguishing, whereby, after a piston in a cylinder valve has been unseated, it will remain unseated until discharge of fluid from the cylinder.

Accordingly, it is a primary object of the present invention to provide a novel cylinder valve of the fluid operative type for use in a fire extinguishing system of the gas distribution type.

It is another object of the present invention to accomplish the above object, wherein means are provided for maintaining the cylinder or container valve in an open condition after its initial actuation thereof, for continued flow of fluid therethrough, irrespective of any deactuation of an actuator associated with the cylinder or container valve.

It is a further object of this invention to provide a means for maintaining the valve open in accordance with any of the objects set forth above, wherein such means employs a venting valve.

It is another object of this invention to provide novel fire extinguishing systems employing novel container valves in accordance with each of the objects set forth above.

It is another object of this invention to provide a novel tool for maintaining a vent piston in an open condition.

Other objects and advantages of the present invention will be readily apparent to those skilled in the art from a reading of the following brief descriptions of the drawing figures, detailed descriptions of the preferred embodiments, and the appended claims.

BRIEF DESCRIPTIONS OF THE DRAWING FIGURES

FIG. 1 is a schematic view of the fluid distribution system, whereby fluid may be delivered from a container, through a container or cylinder valve, through fluid conduit lines to a plurality of line or directional valves, to dissemination points in rooms to have the protection of fire extinguishing equipment, with sensing devices being illustrated for solenoid valves that control the line or directional valves and the cylinder valves.

DETAILED DESCRIPTIONS OF THE PREFERRED EMBODIMENTS

Figure 1:
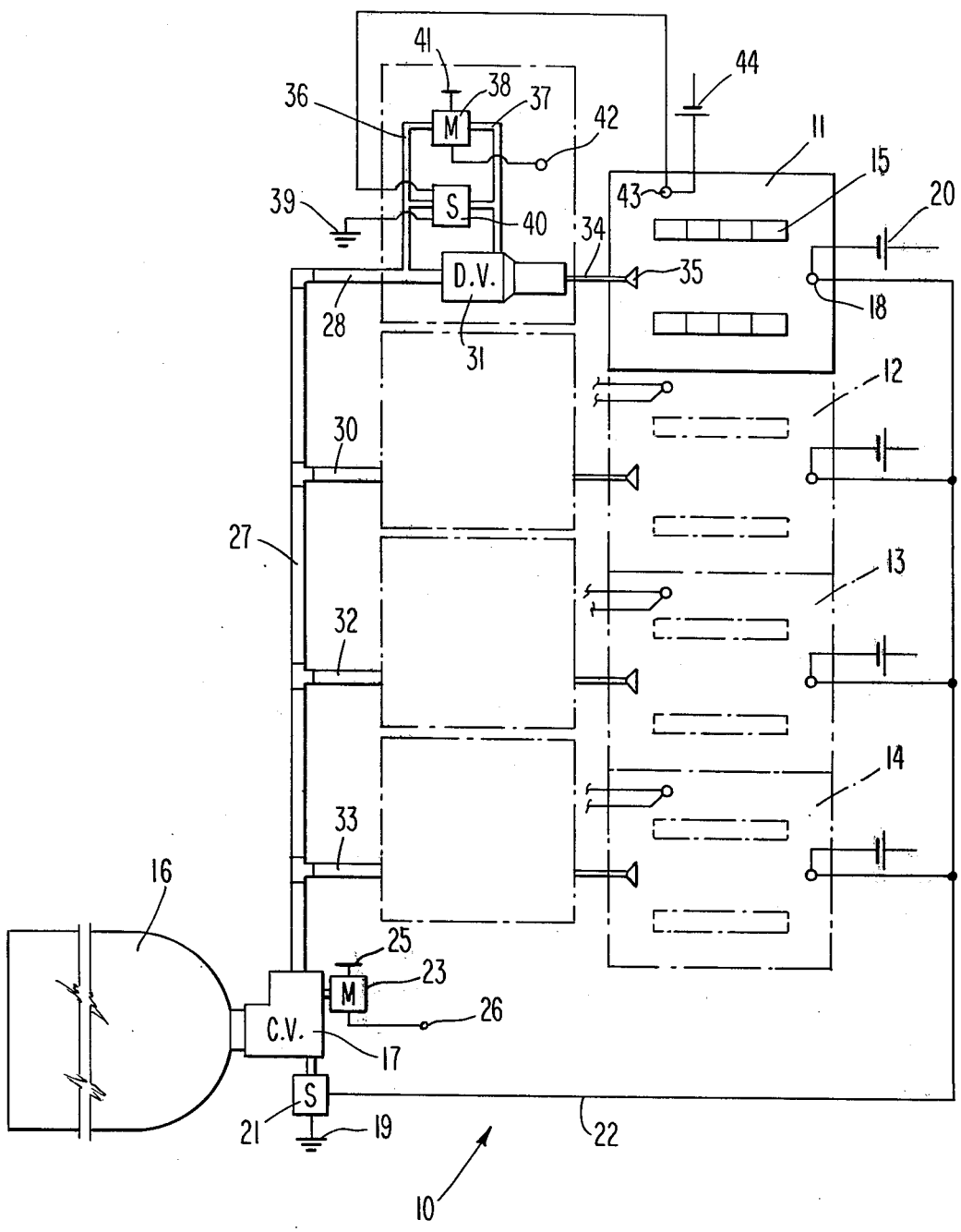

Referring now to drawings in detail, reference is first made to FIG. 1, wherein there is illustrated a system generally designated by the numeral 10, for providing a preferably gaseous fire extinguishing fluid to rooms or zones 11, 12, 13, 14, or the like. This system 10 is adapted to provide fire extinguishing to rooms in which generally valuable components, such as computer equipment 15 are stored, to rapidly extinguish fires in those rooms without damage to the sensitive equipment used therein. It will be apparent that other uses may be made of the systems 10 of the present invention, as well as variations of the uses, but that use for computer rooms is set forth herein as an example only.

The type of fluid utilized is a fluid that when compressed and delivered in cylinder fashion is generally a liquid, but which, by the time it reaches its dispersing point for distribution into the zone of a fire, it is dispersed as a gas that need only be disseminated through a room in low percentages by volume, but which is effective to extinguish flame, even at low volume percentage distribution (1 percent to 3 percent). A fire extinguishing fluid suitable for use with the system of the present invention is DuPont Halon 1301, for example.

The fire extinguishing fluid is normally quite expensive, and therefore the present system has been developed whereby a single container 16 of the compressed fluid (generally liquid when compressed) may be provided, for servicing a plurality of protected zones such as the rooms 11 through 14, by appropriate piping and valving. It will further be understood that this type of system may utilize a plurality of containers or cylinders 16, which feed into a manifold that in turn may feed one or several directional valves for distribution into one or more rooms simultaneously, as desired.

A cylinder valve 17 is provided, mounted on top of the cylinder or other suitable container 16, and a heat sensor, smoke sensor, or sensor of other phenomena, 18 is provided in each of the rooms 11 through 14, preferably actuated by a suitable electric power source 20, for actuating a solenoid switch 21 by passing current through a suitable line 22, when the temperature in a given room, such as that 11 reaches a predetermined level. It will be apparent that each of the other rooms 12 through 14 are equipped with similar sensing mechanisms illustrated, but not specifically described herein, in the interest of avoiding duplication. It will also be apparent that the sensing means 18 may take on any of various forms, and a plurality of such sensing means may be utilized in any given zone or room 11, as needed to adequately protect personnel or equipment or both in the room.

A mechanical actuator or operator 23 is provided for the container valve or cylinder valve 17, with the operator 17 being manually actuable either by depressing a plunger or pulling a cable, or the like, to vent the valve 17 to atmosphere through the operator 23 upon either depressing the plunger 25 or tensioning a pullcable 26, as will be further described hereinafter.

Upon opening the valve 17 by either electrical sensing followed by operation of the solenoid 21, or by mechanical, pneumatic or any other type of actuation of the operator 23, the valve 17 opens, to permit passage of fluid into a distribution line 27, for delivery through distribution lines 28, 30, etc., to suitable line valves or directional valves 31.

The directional valve 31 may pass fluid delivered from the line 28 through a line 34 to a distribution head or point 35, from which point the fire extinguishing gas is disseminated into the room 11.

The valve 31 is provided with a fluid line 36, that communicates with the line 28 for receiving fluid, and with a fluid line 37 that communicates with the valve 31 for delivering valve-opening-fluid-pressure to the valve 31, where needed to open the valve, upon the valve 31 being actuated or operated either by operation or actuation of the manual valve operator 38, or by operation or actuation of the electrically operated solenoid valve operator 40. The manual valve 38 may be operated by manual actuation of the push or plunger member 41, or by pulling of the cable member 42, or phenumatically, as desired, to open the line 36 to the line 37, for opening the valve 31. In the alternative, or even simultaneously, the solenoid valve 40 may be actuated to open the line 36 to the line 37, by means of one or more heat detection, smoke detection, or other suitable sensors 43 in the room 11, powered by a suitable power source 44, such that, when the temperature or other phenomena in the room 11 reaches the predetermined level, not only will the sensor 18 be actuated, but also the sensor 43, for operating the solenoid that controls the solenoid valve 40.

It will be apparent that each of the lines 30, 32, and 33 are provided with similar valves, piping, and controls to those 31, 36, 37, 38 and 40 heretofore described, and that the rooms 12 through 14 are also provided with suitable sensors, similar to those 43, as well as distribution or dispersion points, as needed.

It will be apparent from the foregoing that should a fire commence in one or more of the rooms 11 through 14, a sensor 18 (generally electrically operative) will open the valve 17 and make gaseous fluid available to each of the directional valves or line valves like the valve 31. Substantially simultaneously, the sensor 43 will open the directional valve for delivery of gas through the distribution or dispersion point in the room in which the fire is located. It will also be apparent that the valves 17 and 31 may be manually actuated if desired, based upon a manually actuating valve design, or more important, should the electronic sensing mechanism fail in the fire, the system may still be utilized by manual actuation. It will further be understood that the sensors, instead of being electrically operative, could be of the type that produces a pressure signal, and in that case the operators 23 or 38 may be of the pressure responsive type. It will further be apparent that the sensors 18 and 43 could be connected in series as a precaution against accidental gaseous discharge so that the valves controlled thereby could not be other than simultaneously opened.

Figure 2:
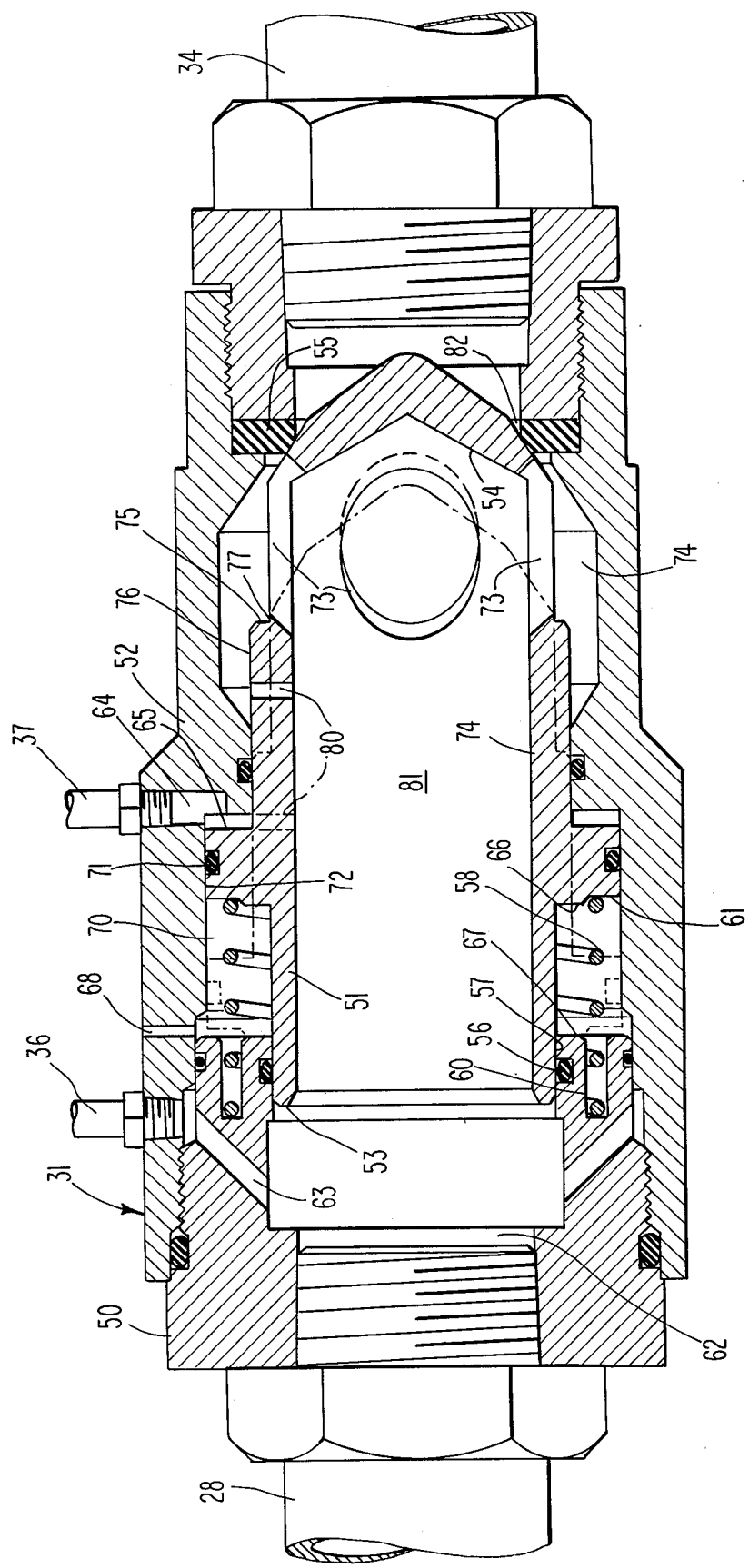
FIG. 2 is a longitudinal sectional view through a line or directional valve of the type illustrated in FIG. 1.

Referring now to FIG. 2 in detail, the line valve or directional valve 31 will be described in greater detail. At this point the fluid is delivered as a gas to the inlet 50 of the valve, generally at a desired predetermined pressure, for exposing the generally cylindrically configured piston 51 longitudinally moveably disposed within the casing 52 thereof to the desired pressure. The pressure is operative against the end 53 of the piston 51, as well as against the closed end 54 thereof, an outer portion of which is illustrated in FIG. 2 in seated engagement against an annular rubber, plastic or the like valve seat 55. A suitable ring seal of rubber or like construction 56 seals the outer surface 57 of the piston 51 relative to the member 50.

A cylindrically wound spring 58 seated in an annular slot 60, and in engagement against a transverse surface 61 of the piston 51, urges the piston 51 toward seated engagement against the valve seat 55.

The gaseous fluid received at the inlet 62 is free to pass up the communication port 63, to the line 36, and when permitted by opening either the manual operator 38 or the electrically operated solenoid operator 40, the inlet pressure 62 is delivered to the line 37, through the inlet 64, to bring the transverse second opening-pressure-operative surface portions 65 into contact with operating fluid pressure, in a direction opposite to the direction of force application of the operating fluid against the first opening-pressure-operative surface portions 53 and 54, for example, and in a direction toward compression of the cylindrically wound compression spring 58, whereby, under the force of fluid provided against surface portions 65, the piston 51 will move from the full line position illustrated in FIG. 2 to the phantom line position illustrated therefor, bringing the surface 66 toward, or against the surface 67.

A suitable vent 68 is provided, for permitting leftward movement of the piston 51 between the full line and the phantom positions illustrated in FIG. 2, in order that air entrapped in the zone 70 will not prevent the opening movement of the piston 51. It will also be apparent that a suitable ring type seal 71 is provided, preventing leakage of gas pressure between the members 52 and 51 along sliding surface zone 72.

A plurality of openings 73 are provided through the cylindrical wall 74 of the piston 51, but ahead of the valve seat 55, as illustrated in FIG. 2, in order that incoming fluid pressure will exist in the zone 74 that is cut out of the casing 52, for exposure of the transverse third surface portions 75 to opening fluid pressure, while the piston 51 is seated against the valve seat 55.

In the static condition of the valve 31, with fluid pressure that is delivered at the point 62 also being delivered for exposure of the surface 75 thereto, and with the surface 75 facing in an opposite direction to the surfaces 54 and 53, it will be noted that, with the valve operators 38 and 40 closed, such that no opening fluid pressure is delivered to the line 37, and with the closed end portion 54 of the piston 51 in seated engagement against the valve seat 55, the same pressure that is delivered against the first surface portions 53 and 54, to tend to urge the piston 51 toward the valve seat 55, is also delivered to the surfaces 75. This provides a counter-pressure force, that operates in a direction that, by itself, would tend to urge the piston 51 open, with its closed end portion 54 away from the valve seat 55, but that is of such a selected area size that it serves to offset some of the force with which the piston 51 would otherwise be urged against the valve seat 55. Accordingly, the size of the annular surface area 75 that operates to at least partially reduce the net longitudinal pressure on the piston 51, is carefully selected to offset as much as possible unnecessary seating forces of the closed end portion 54 of the piston 51 against the valve seat 55. For example only, but not by way of limitation, if the inlet fluid pressure at the location 62 is 360 p.s.i., the outer diameter of the outer piston wall portion 76, and the inner diameter 77 that defines the surface area 75 may be selected such that the ultimate net force of the piston 51 against the valve seat 55 does not exceed 1,000 pounds, should the same be desired, when the piston 51 is in the static condition illustrated in full lines in FIG. 2. Also, if desired, any forces provided by the compression spring 58 may be taken into account in selecting the desired size for the surface area 75. It will therefore be seen that dimensional selections for the various components may almost keep in balance the various forces acting on the piston 51, but with there always being a net resultant force that keeps the closed end portion 54 of the piston 51 disposed against the valve seat 55, when the valve 31 is to be closed as illustrated in full lines in FIG. 2.

When the lines 36 and 37 are opened to each other, such that the piston 51 is moved to the phantom line position illustrated in FIG. 2, it will be noted that a vent opening 80 through the cylinder wall 74, communicates the interior 81 of the piston with the inlet 64, to permit venting thereof, so that the piston 51 will not return to its closed condition while it is desired that the valve 31 be open.

When the valve 31 is open, with the piston 51 in the phantom position illustrated in FIG. 2, it will be apparent that the gas is delivered through the openings 73, around the closed end 54 of the piston 51, through the hole 82 in the valve seat 55, and through the line 34, to a dispersion point 35. It will therefore be apparent that, even when a valve seat 55 is constructed of rubber, plastic, or other suitable, generally softer materials than the materials in construction of the closed end portion 54 of the piston 51, and even when the valve 31 is subjected to very high pressures, undue forces will not be imposed on the valve seat 55 that may otherwise tend to crush them, but that the pressures on the valve seat 55 may be carefully controlled due to the use of counterpressure on the surfaces 75.

The solenoid valve 40 may be of any suitable type, such as will open the lines 36 and 36 to communication with each other, upon the sensor 43 (if electrical) causing to complete the circuit between the power source 44 and ground 39. In the alternative, any other suitable circuitry may, of course, be utilized, such that a sensor 43 will actuate a solenoid valve 40, to open the line 37 to the line 38, for opening of the directional or line valve 31.

Figure 4:
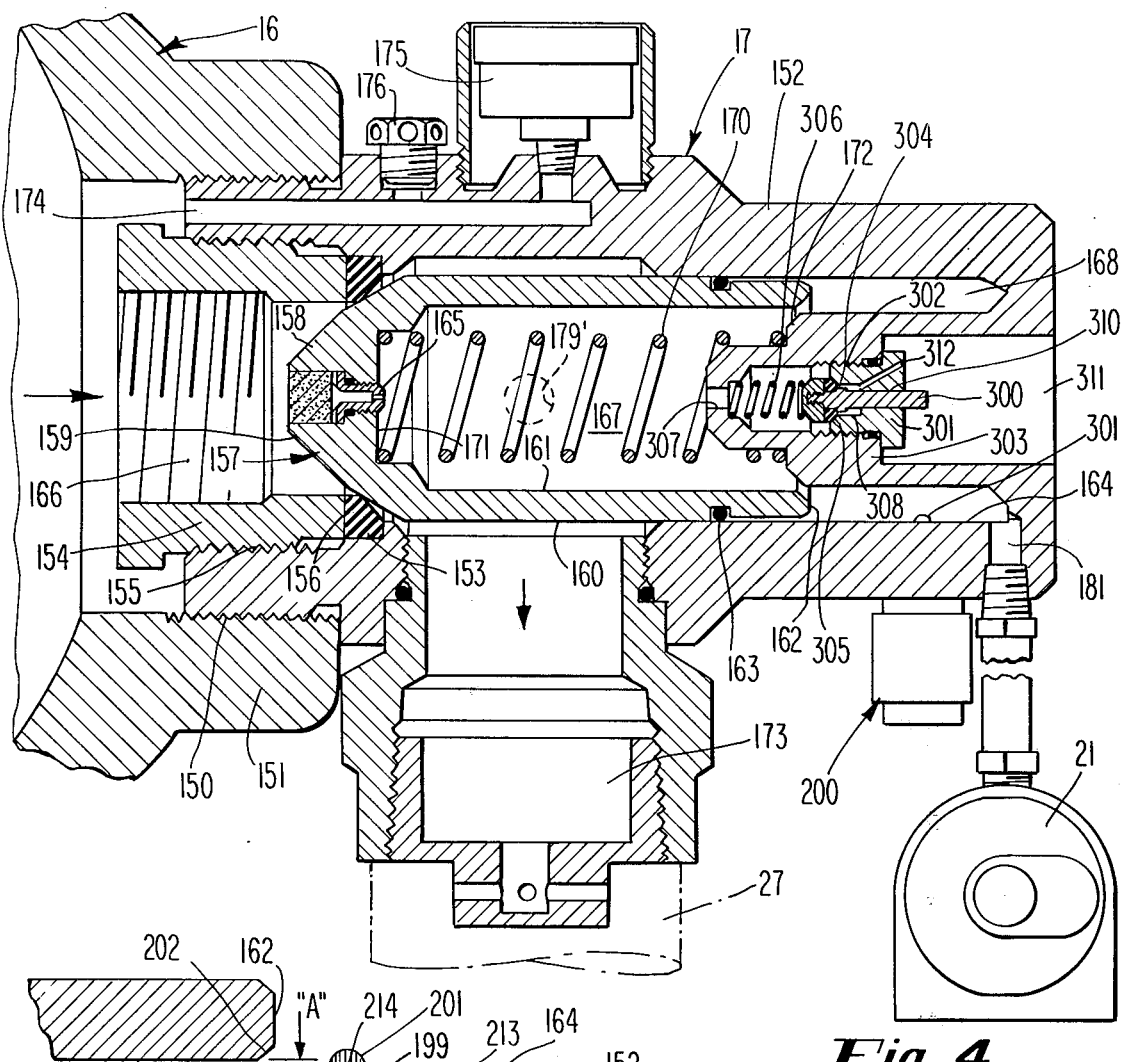
FIG. 4 is a longitudinal sectional view taken through a container valve or cylinder valve of the type illustrated in the schematic of FIG. 1.

With particular reference to FIG. 4, the cylinder or container valve 17 is generally illustrated, in threaded engagement at 150 with the neck 151 of a cylinder 16.

The valve 17 comprises a casing 152 that has a valve seat 153 fixedly disposed therein by threaded sleeve member 154 being tightly threaded at 155, thereagainst, at 156. The fluid from the container 16 is therefore disposed within the sleeve member 154, against the piston 157. The piston 157 is constructed to have an end-closing portion 158 and a generally cylindrical portion 160, having a bore 161 therein, and terminating in an extended cylindrical piston portion 162, with a suitable sealing ring 163 sealing the cylindrical portion 160 of the piston 157, relative to a bore 164 in the housing 152. A small hole 165, allows passage of the incoming fluid from the zone 166 into a cavity 167 on the rear side of the piston 157, such that, in the closed condition of the valve 17 illustrated in FIG. 4, fire extinguishing fluid is present in both zones 166 and 167 on opposite sides of the piston 157. The cavity 167 extends to a rearward cavity zone 168 which also accommodates the extended portions 162 of the piston 157, when the piston 157 is moved in a rightward direction from its position illustrated in FIG. 4, away from the valve seat 153. Such movement would be against the force exerted by the cylindrically wound compression spring 170 that tends to urge the piston 157 leftward as viewed in FIG. 4, inasmuch as the spring 170 is in abutment at its left end against surface 171, and at its right end against surface 172.

Thus, while the port 165 between the front side 166 and rear side 167 of the piston 157 is small, it is adapted to allow filling of the cavity 167 (including communicably related cavity portion 168) slowly, but not rapidly. It will thus be seen also, that in the position illustrated in FIG. 4 for the piston 157, fluid is prevented from discharge through the line 173 to the line 27. It will be noted that fluid pressure also communicates through the line 174, in the static position for the cylinder valve 17 illustrated in FIG. 4, to a gauge 175, for visual observation of pressure indication, and also to a burst disc 176. A normally closed blind plug 179' is provided in the casing 152 for optional connection to other cylinders, for firing them along with cylinder 16, if desired. The fluid in container 16 is normally a liquid, and in the closed condition of the valve 17, gas from the liquid fills cavity 167. When the valve 17 is open and rapid expansion takes place, the liquid fluid in container 16 is transformed to the gaseous state.

When it is desired to open the valve 17, to permit passage of fluid therepast, such may be accomplished either by manual actuation of the valve operator 23, to open or exhaust from the zone 167, by engaging the plunger 300 and leftward movement thereof, as viewed in FIG. 4, to discharge through the port 307, whereby fluid in the cavity 167, 168 may be evacuated therefrom, thereby reducing pressure on the rearward side of the piston 157, such that the pressure against the forward surface 159 thereof, forces the piston away from the seat 156, or in the alternative, the cavity 167, 168 may be vented to atmosphere through the line 181 by actuation of solenoid valve operator 21. The solenoid valve 21 operates in a manner similar to that described above for the solenoid valve 49, except that it opens the cavity 167, 168 to atmosphere, for rightward movement of the piston 157 away from its seat 153, just as opening of the manual operator 23 so exposes the cavity 167, 168, to atmosphere, for exhaustion of fluid therefrom.

The mechanical valve operator 23 is constructed similar to, and operates similar to the mechanical valve operator 38, so duplication thereof will not be required herein, by way of description and only operator 23 will be described in detail herein.

The solenoid type operator 21 that evacuates the cavity 167, 168 to permit rightward movement of the piston 157 away from its seat 153 is, itself, operated by means of the sensor 18 that is temperature or smoke responsive, or responsive to other phenomena, to complete a circuit between a power source 20 and ground 19, or in any other manner that automatically operates a valve 21 by automatic temperature sensing techniques.

It is particularly important when the sensing member 18 is of the electrical type, and when the valve 21 thereof is open to facilitate venting of the cavity 167, 168, that the valve 21 not close should fire reach and damage the sensing member 18, or any other part of the wiring system or the like that operates the valve 21. To this end, means is provided for retaining the piston 157 in an open, or rearward retracted position, away from its seat 153, once either the manual operator 23 or the electric operator 21 has called for and effected the opening of the valve 17. Accordingly, a venting mechanism 200 is provided, having a protruding plunger member 201 that extends into the cavity 168, for engagement by extended piston portion 162. To this end, reference is made to FIG. 5, wherein the device 200 in the form of an air vent is provided, that provides a continual bleed of fluid from the cavity 167, 168, thereby preventing re-seating of the piston 157. The vent valve 200 is provided with a floating plunger member 201 that is engaged by piston portion 162, particularly by the cammed edge 202 thereof, with the outer diameter 203 of the cylindrical piston portion being sized relative to the bore 164 at that point, to remain spaced from the bore 164 an amount "A", that may vary depending upon the sizes of the structures, but that is sufficient to allow passage of fluid from the cavity 167, 168, outwardly of the opening 203, when the floating plunger member 201 moves the elastomeric, rubber or the like piston portion 203 and the piston 204 that carries it away from the seat 205. It will be noted that the floating plunger member 201 is provided with a controlled amount of play as indicated by the dimension "B" in FIG. 5, that is pre-determined to open the piston 204 (and its portion 203) away from the seat 205. A cylindrical wound compression spring 206 is provided, seated at its lower end as viewed in FIG. 5, against a portion 207 of a sleeve-type housing member 208, that in turn is in threaded engagement at 210 with the housing 152 of the valve 17. The opposite end of the compression spring 206 is in engagement against the surface 212 of the piston 204.

The plunger member 201 is captured by overhanding flange portion 213, and is sized for clearance in hole 199 for passage of fluid therebetween or may optionally be provided with a fluted or longitudinally grooved surface 214, to provide passageways for fluid being released from the cavity 167, 168, through the passageways 214, through the opening between the piston portion 203 and the valve seat 205, through the cavity 215, through the opening 216 between the piston 204 and the annular inwardly protruding ring 217 of the housing 208, and out the opening 218 in a protective cap 220 that in turn is threaded at 221 into an internally threaded bore 222 in a tool 400. It will thus be apparent that, once the plunger 214 is depressed by the piston portion 202, the cavity 167 and 168 will remain vented to atmosphere, and the piston 157 will remain open for flow of fluid from the zone 166, into the line 173. While fluid will be free to pass into the cavity 167 through the small port or opening 165, it will be noted that the opening 165 is so small that by the time that any significant amount of fluid enters the cavity 167, there will have already been complete discharge of fluid from the container 16.

Figure 3:
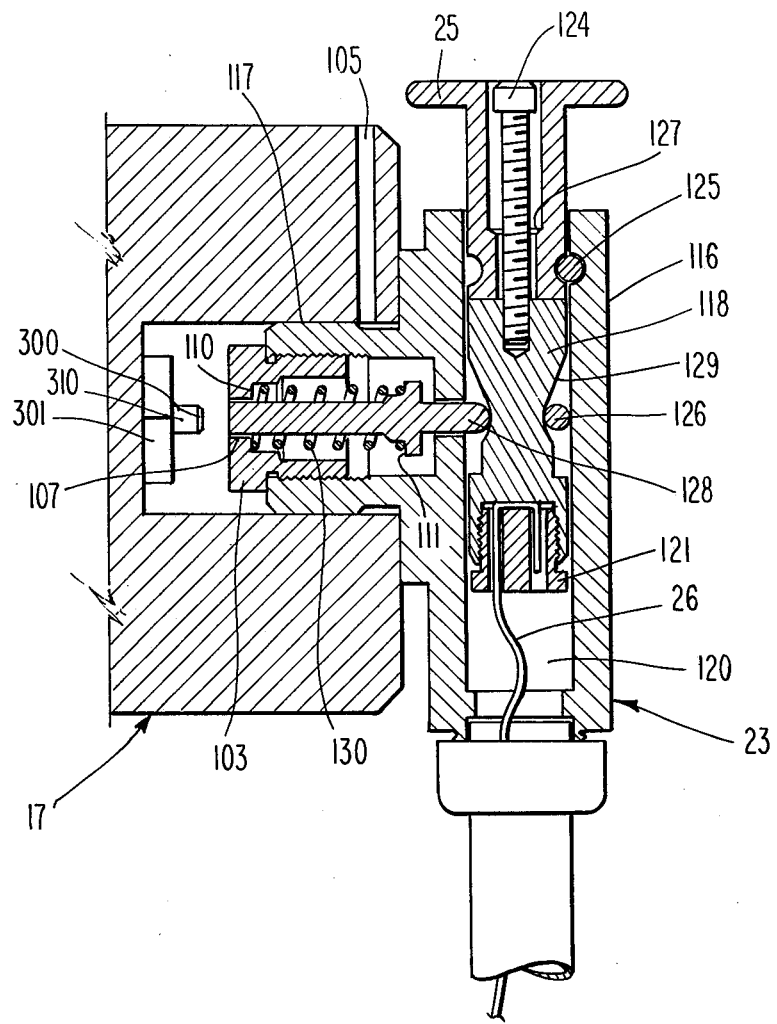
FIG. 3 is a longitudinal sectional view, taken through a manually-operable valve operator of the type used for operating a cylinder valve, of FIG. 1.

With particular reference to FIG. 3 now, the operator 23 is illustrated as comprising a mechanism adapted to engage the plunger 300 to release fluid from the cavity 167, 168, through the port 307.

In this regard, the plunger 300 when engaged and moved leftward from the position therefor illustrated in FIG. 4, will have its left-most end unseated from the seat 305, and be moved against the compression spring 306, whereby the fluid in the zone 167 will be free to pass through port 312 in plug 301 that in turn is in threaded engagement at 302 in a boss 303 carried by the right-most end 304 of the housing 152 of the valve 17, with the fluid then passing outwardly of the bore or end opening 311, to vent.

The operator 23 has a casing 116, and another casing portion 117 adapted to be received within the bore or end opening 311 of the valve 17. The casing 116 houses a detent piston 118 axially movable in the bore 120 of the operator 23. One end of the piston 118 is provided with a threaded connector 121 that in turn has the cable 26 carried thereby, for grasping and actuation, in order to move the plunger 118 in the direction of the cable, for one type of manual actuation thereof. The opposite end of the piston 118 is provided with a push plunger 25 connected thereto by means of bolt 124. Pull pins 125 and 126 respectively hold the plunger and pistons against axial movement in the bore 120. Removal of a pull pin 125, 126 allows axial movement of the piston or plunger respectively. If the pull pin 126 is moved to allow the cable 122 to actuate the piston, it will be seen that the push plunger may remain in position, in that the bolt 124, while being threaded for movement with the piston 118, is free to slide through the push plunger until the head of the bolt 124 engages the plunger shoulder 127. If both pins 125 and 126 are pulled, either the push plunger or the cable 122 may be utilized to actuate the secondary plunger 128, by the cam surfaces 129 of the piston. The plunger 128 is rightwardly biased as viewed in FIG. 3 by a compression spring 130 engaged against a shoulder 111 of the secondary plunger, with the opposite end of the spring 130 being in engagement against a surface 110 of a nut 103 that in turn is in threaded engagement with the casing portion 117. It will be noted that the external surface of the auxiliary plunger 128, at its left-most end is sufficiently sized relative to the bore 107 through the nut 103, to permit passage of air therethrough after opening of the plunger 310 by engagement with member 300, whereby fluid may be vented through the nut 103, through an appropriate port (not shown) in the casing portion 117, and out through the vent opening 105.

It will be apparent from the foregoing that any suitable means may be used to mechanically release fluid from, or open the zone 167, to atmosphere, including the use of push plungers, cables, pressure means that are responsive to heat or other phenomena in a room, and which may be operative upon the plunger 300 to open the same, or any other suitable means.

Figure 5:
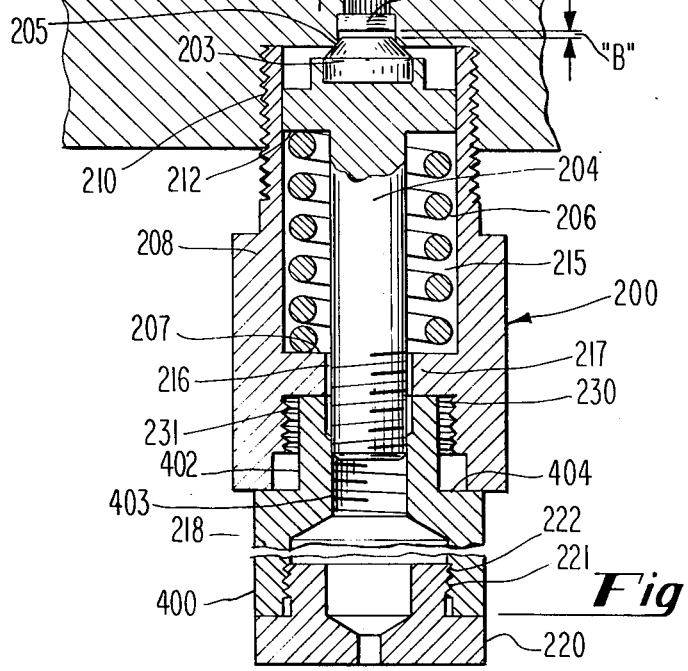
FIG. 5 is a longitudinal sectional view, taken through a vent valve for the cylinder valve illustrated in FIG. 4, for keeping the piston cavity to the rear of the piston illustrated in FIG. 4 vented, once the piston has been opened.
Figure 6:
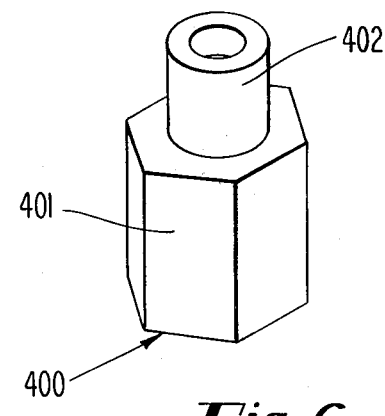
FIG. 6 is an illustration of a tool of the type adapted for manual use with the vent valve of FIG. 5, to keep the piston thereof in an unseated condition for continued venting after re-seating of the piston of the cylinder valve.

With particular reference now to FIGS. 5 and 6, a tool 400 is shown having a hex portion 401 for wrench engagement and an extension portion 402. Portion 402 is internally threaded at 403 to engage the threaded end of member 204 for backing member 204 and consequently the piston portion 203 away from valve seat 205, for use of the tool 400 to maintain the device 200 in venting condition, as for example during storage or shipment after use, to prevent buildup of pressure from residual fluid in a cylinder. In use, the tool 400 allows venting through itself by axial grooves (not shown) through its threaded portion 403, through oversize threads, or by any other means, so that venting may occur through the hole 218 in its cap 220 when the tool is screwed to a venting position.

It will be apparent from the foregoing that while a particular embodiment of the invention is described and illustrated herein, as well as particular other features of the environment of use of the present invention, the specifics may vary depending upon the desired parameters at any given time, and the details of construction of individual parts, as well as their use and operation may also vary, all within the spirit of the invention as defined in the appended claims.

What is claimed is:

1. In a cylinder valve of the fluid operative type for use in a fire extinguishing system of the fluid distribution type, wherein the valve includes a moveable piston slideably disposed in a housing, with the housing having a fluid inlet and a fluid outlet and a valve seat therebetween, with the piston normally having a front end disposed against the valve seat in the closed condition of the valve, with a fluid communication port connecting the front of the piston with a cavity at the rear of the piston for facilitating the equalizing of fluid pressure on opposite sides of the piston while the valve is in the closed condition with the piston seated, and with the fluid communication port being sized to prevent rapid fluid flow across the piston, with means being provided for rapidly evacuating the fluid from the cavity at the rear of the piston relative to the flow of fluid through the fluid communication port and for releasing forces on the rear side of the piston that oppose unseating fluid forces on the piston and thereby unseating the piston, the improvement comprising vent means for maintaining a venting of the cavity at the rearward side of the piston after initial unseating of the piston, wherein said vent means comprises a normally closed vent valve having a plunger extending partially into said cavity for operative engagement by said cylinder valve piston upon its movement to open the valve for outward movement of said plunger, said vent valve being automatically openable by said movement of said plunger.

2. The improvement of claim 1, wherein said vent valve comprises a vent piston operatively actuable by said plunger member normally seated in a vent valve seat in a vent valve casing, for passing fluid outwardly therethrough upon said movement of said plunger member.

3. The improvement of claim 2, wherein said cylinder valve piston comprises a cylindrical wall having a substantially closed end, with a rearward-most portion of the cylindrical wall comprising the means for actuating the said vent means.

4. The improvement of claim 2, including a manually actuable tool for engaged relation with said vent piston and vent housing for manual retention of the vent piston in unseated disposition related to the vent valve seat, for continued venting of said cavity after reseating of the cylinder valve piston.

5. The improvement of claim 1, wherein the means for rapidly evacuating the cavity and for releasing forces on the rear side of the cylinder valve piston comprises electrically operated solenoid valve means.

6. The improvement of claim 1, wherein the means for rapidly evacuating the cavity and for releasing forces on the rear side of the piston comprise electrically operated solenoid valve means and manually operable valve means, each selectively and alternatively operable.

* * * * *